United States Patent Office 3,658,717
Patented Apr. 25, 1972

3,658,717
SURFACTANTS FOR SOLVENT/WATER SYSTEMS AND TEXTILE TREATING COMPOSITIONS
Kenneth W. Graff, Wilmington, Del., assignor to Atlas Chemical Industries, Inc., Wilmington, Del.
No Drawing. Filed July 7, 1969, Ser. No. 839,621
Int. Cl. B01f 17/18
U.S. Cl. 252—355
7 Claims

ABSTRACT OF THE DISCLOSURE

Disclosed are (a) novel surfactant compositions comprising a blend of a cationic surfactant represented by the formula

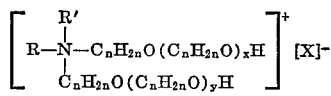

wherein $n$ represents an integer from 2 to 4, $x$ represents a number from 0 to 100, $y$ represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion, and an anionic surfactant characterized by a generalized formula selected from the group consisting of the following generalized formulae wherein identical symbols have identical signification:

(1)

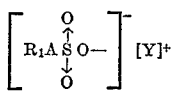

and (2)

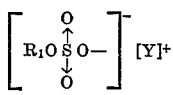

wherein $R_1$ represents a radical selected from the group consisting of alkyl and alkenyl radicals containing from 6 to 22 carbon atoms, A represents an arylene radical, and Y represents a cation; (b) a fluid carrier composition for the treatment and processing of textile materials which comprise water, an organic liquid, and said novel surfactant composition; and (c) textile treating compositions comprising said fluid carrier composition and a textile treating agent. Also disclosed is a textile treating composition comprising a blend of a textile softening agent and said novel surfactant composition.

This invention relates to textile treating compositions, to methods of treating textiles, to textiles having improved properties, and to surfactants for solvent/water systems. More particularly, this invention relates to compositions comprising fluid systems useful in the treatment of textile materials and to surfactant compositions containing cationic and anionic surfactants. This invention further relates to methods of application of textile treating agents to textile fibers, yarns, filaments, fabrics and the like and to textile materials having improved properties.

Conventionally, water has been utilized in the application to textiles of chemical treating and finishing agents of wide variety, scope and character. Notwithstanding the valuable nature of water and its properties to the textile processor as a functional fluid for such application, attention has turned in recent times to the potential utilization of organic fluids in textile processing by way of the substitution of such fluids for aqueous systems in whole or part. The advantages attendant upon such substitution resides not only in greater operational efficiencies but also in the abundance of organic fluids with respect to both quantity and kind, whereby the character and number of the chemical agents which may feasibly be employed in the treatment of textiles generally is measurably broadened in scope. The utilization of organic fluids in solvent systems for the processing of textile materials in the manner suggested has, however, been limited by the fact that although a very large number of chemical treating agents, such as antistatic compounds, softening compounds, durable press compounds and the like, are themselves soluble or readily dispersible in potentially useful organic fluids, frequently water-soluble compounds or compositions which act as catalysts or assistants or are otherwise auxiliary, yet essential, to the successful utilization of the primary treating agent, are neither soluble in the same organic fluids nor even adequately dispersible therein for periods of time sufficient to effect the textile treatment desired. Therefore, a fluid system in which both types of compounds may be adequately "solubilized" or dispersed represents an optimal treating fluid for the processing of textile material, whereby the advantages of both water-immiscible organic fluid systems and aqueous systems are, at least in some measure, combined.

It is, accordingly, an object of this invention to provide a fluid system wherein both compounds soluble in organic fluids and compounds soluble in water may be adequately dispersed for subsequent treatment of textile materials.

It is another object of this invention to provide a novel surfactant composition suitable for the dispersion or "solubilization" of water in organic fluid.

It is another object of this invention to provide a fluid carrier composition for the treatment and processing of textile materials which comprises both aqueous and organic fluids.

It is another object of this invention to provide novel textile treating compositions.

It is another object of this invention to provide methods for the treatment of textile materials.

It is another object of this invention to provide textile materials having improved physical properties.

The foregoing objects and still further objects of this invention are essentially realized by providing a novel surfactant blend whereby water may be uniformly dispersed in a water-immiscible organic fluid to provide a fluid carrier composition or system from which textile treating agents, ordinarily soluble in organic liquid but which require the concomitant presence of a water-soluble material, may successfully be applied to textiles to effect the finishing or other treatment thereof.

The surfactant composition useful in accordance with the present invention to prepare novel textile treating fluids comprises a cationic component and an anionic component which are blended together within critical proportions by weight. Broadly, in accordance with this invention, the cationic and anionic components of the said surfactant blend are combined within the following ranges of percentage composition by weight:

TABLE I

| Component: | Percent by wt. |
|---|---|
| Cationic surfactant | 5–95 |
| Anionic surfactant | 95–5 |

In general, if more than about 19 parts by weight of the cationic component of the surfactant blend are combined with a unit part by weight of the anionic component thereof, the fluid carrier composition into which the surfactant blend is incorporated tends to excessive viscosity, while if less than about 0.05 parts by weight of the cationic component is combined with a unit weight of the anionic component, emulsification of the aqueous and organic components of the carrier fluid is unsatisfactory. The surfactant compositions of this invention most frequently used contain from about 25% to about 75% by weight, and preferably from about 50% to about 65% by weight, of the cationic surfactant and from about 75% to about 25% by weight, and preferably from about 50% to about 35% by weight, of the anionic surfactant, based on the total weight of cationic surfactant and anionic surfactant.

The cationic component of the surfactant blend, as provided in accordance with this invention, is comprised of a class of cationic surfactants which includes quaternary salts of alkoxylated aliphatic tertiary amines containing one long-chain alkyl or alkenyl group and which is characterized by the following generalized formula:

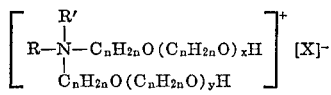

wherein $n$ represents an integer from 2 to 4, $x$ represents a number from 0 to 100, $y$ represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion. A preferred class of cationic surfactants is characterized by the foregoing generalized formula wherein the sum of $x$ and $y$ is a number from 5 to 50. Alkyl and alkenyl radicals represented by R include such typical radicals as hexyl, octyl, nonyl, decyl, dodecyl, margaryl, stearyl, oleyl, linoleyl, palmityl, behenyl, lionlenyl and the like. Alkyl radicals represented by R' typically include methyl, ethyl, propyl, isopropyl, n-butyl, isobutyl, sec-butyl, t-butyl, n-amyl, isoamyl, sec-amyl, t-amyl and other isomeric amyl radicals. Hydroxyalkyl radicals represented by R' are exemplified by hydroxyethyl, hydroxypropyl, hydroxyisopropyl, dihydroxypropyl, hydroxybutyl, dihydroxbutyl, hydroxymethyl, dihydroxyamyl and the like. Anions typical of those represented by X- are the chloride, bromide, fluoride, iodide, sulfate, sulfonate, phosphate, phosphite, cyanate, isocyanate, sulfite, bisulfite, nitrate, nitrite, oxalate, silicate sulfide, acetate ethyl sulfate and other common inorganic and organic ions.

Quaternary salts of ethoxylated fatty amines of the kind described above are well known, many are commercially available and all may be prepared by means of conventional chemical reactions and procedures.

The anionic component of the surfactant blend of the present invention is comprised of classes of anionic surfactants which include the alkyl amine and alkali metal salts of alkyl aryl sulfonates and alkyl hydrogen sulfates, the latter usually being derived from long chain alcohols.

The anionic surfactant may be characterized by a generalized formula selected from the group consisting of the following generalized formulae wherein identical symbols have identical signification:

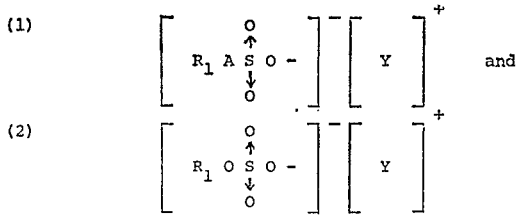

wherein $R_1$ represents a radical selected from the group consisting of alkyl and alkenyl radicals containing from 6 to 22 carbon atoms, A represents an arylene radical, and Y represents a cation. Exemplary of alkyl and alkenyl radicals represented by $R_1$ are the hexyl, octyl, heptyl, nonyl, decyl, dodecyl, margaryl, stearyl, oleyl, linoleyl, palmityl, behenyl, linolenyl and similar radicals. Arylene groups represented by A are exemplified by phenylene, naphthylene and aromatic groups of similar character. Cations represented by Y include ions of the alkali metals, such as sodium, potassium and lithium and alkyl substituted ammonium ions wherein the alkyl substitutents are typified by methyl, ethyl, n-propyl, isopropyl, n-butyl, isobutyl, sec-butyl, t-butyl, n-amyl, isoamyl, sec-amyl, t-amyl and other isomeric amyl radicals.

The following are representative examples of the surfactant blend of this invention. A preferred surfactant blend is shown in Example 1.

EXAMPLE 1

| | Grams |
|---|---|
| Diethyl sulfate quaternary salt of polyoxyethylene (20) hydrogenated tallow amine | 63 |
| Isopropyl amine dodecyl benzene sulfonate | 37 |

EXAMPLE 2

| | |
|---|---|
| Diethyl sulfate quaternary salt of polyoxyethylene (5) hydrogenated tallow amine | 55 |
| Sodium lauryl sulfate | 45 |

EXAMPLE 3

| | |
|---|---|
| Methyl chloride quaternary salt of polyoxypropylene (2) hexyl amine | 61 |
| Sodium stearyl benzene sulfonate | 39 |

EXAMPLE 4

| | |
|---|---|
| Butyl acetate quaternary salt of polyoxyethylene (50) decyl amine | 65 |
| Potassium palmityl sulfate | 35 |

EXAMPLE 5

| | |
|---|---|
| Diethyl sulfate quaternary salt of polyoxyethylene (100) behenyl amine | 64 |
| Propyl amine salt of decyl napthalene sulfonate | 36 |

EXAMPLE 6

| | |
|---|---|
| Butyl nitrate quaternary salt of polyoxyethylene(200) margaryl amine | 63 |
| Isopropylamine dodecyl sulfate | 37 |

EXAMPLE 7

| | |
|---|---|
| Ethyl iodide quaternary salt of polyoxyethylene(75) oleyl amine | 75 |
| Isopropyl amine nonyl benzene sulfonate | 25 |

EXAMPLE 8

| | |
|---|---|
| Diethyl phosphate quaternary salt of polyethylene (150) nonyl amine | 70 |
| Sodium behenyl sulfate | 30 |

EXAMPLE 9

| | |
|---|---|
| Methyl chloride quaternary salt of polyoxyethylene (25) hydrogenated tallow amine | 25 |
| Butyl amine octyl benzene sulfonate | 75 |

EXAMPLE 10

| | |
|---|---|
| Ethyl chloride quaternary salt of polyoxypropylene (15) dodecylamine | 36 |
| Potassium lauryl sulfate | 64 |

EXAMPLE 11

| | |
|---|---|
| Diethyl sulfate quaternary salt of polyoxyethylene (20) hydrogenated tallow amine | 55 |
| Isopropyl amine dodecyl benzene sulfonate | 45 |

EXAMPLE 12

| | |
|---|---|
| Diethyl sulfate quaternary salt of polyoxyethylene (20) hydrogenated tallow amine | 60 |
| Isopropyl amine dodecyl benzene sulfonate | 40 |

Organic fluids which may be utilized in the preparation of a fluid carrier composition in accordance with this invention comprise organic fluids which are ordinarily immiscible with water and are represented by such well-known textile treating fluids as petroleum solvents and synthetic chlorinated solvents. Among the petroleum solvents which may be used are mineral spirits, naptha and Stoddard solvent. Synthetic organic solvents include 1,1,1 - trichloroethane, 1,1,2 - trichloroethane, trichloroethylene, perchloroethylene, chloroform, carbon tetrachloride, pentachloroethane, dichlorobenzene, methylene chloride, hexochloroethane, dichloroethane, chlorobenzene and other water-immiscible organic fluid materials.

In accordance with this invention, a suitable organic textile treating fluid may be combined in any proportion with water to provide a carrier composition from which both an organic-fluid-soluble textile treating agent and a water-soluble textile treating agent may concomitantly be applied to textile materials. The carrier composition may comprise either a dispersion of water in oil or a dispersion of oil in water and the selection of the type of emulsion will, in any given instance, depend upon the textile treating operation to be performed and the particular treating agents to be used. Nothwithstanding that a water-immiscible organic fluid and water can be combined in any proportion to provide a suitable fluid emulsion sufficiently stable for use in the treatment of textile materials, the quantity as well as the proportions of the surfactant blend incorporated therewith to form the fluid emulsion are critical thereto. Although with any blend of the earlier-identified surfactants within the range earlier specified, a fluid emulsion can be formed of water and a water-immiscible organic fluid of the character previously described, the quantity of the blend used to form said emulsion must be judiciously selected by trial and error, if necessary, to avoid the formation of a paste or a gel or a fluid that is otherwise too viscous for optimum use. For example, it has been observed that a water-immiscible organic fluid (1,1,1-trichloroethane) and water combined in equal proportions by weight form a suitable fluid emulsion upon the addition of surfactant blend (63% by weight of the diethyl sulfate quaternary salt of polyoxyethylene(20)hydrogenated tallow amine and 37% by weight of the isopropyl amine salt of dodecyl benzene sulfonate) in a ratio to water by weight within a range of about 2/100 to about 70/100; upon addition of surfactant in a weight ratio to water of above about 70/100 to about 80/100, a paste is formed and upon addition of surfactant in a weight ratio to water above about 80/100, a gel is formed. However, 1,1,1-trichloroethane and water combined in a ratio by weight of 70 parts of the former to 30 parts of the latter is observed to form a fluid emulsion upon addition of the same surfactant blend in a ratio by weight to water within a range of about 2/00 to about 32/100; a paste is formed upon addition of the surfactant in a weight ratio to water within the range of above about 32/1000 to about 53/100; a translucent fluid emulsion is formed upon addition of the surfactant to water in a weight ratio within the range of above about 53/100 to about 73/100 and upon addition of the surfactant in a weight ratio to water above about 73/100, a gel is formed. Manifestly, no generalized statement can be made specifying the exact quantity of surfactant blend which may be used to produce carrier composition comprising a fluid emulsion of water-immiscible organic fluid and water in all cases, since that quantity will depend not only upon (a) the proportions of the particular surfactants of the blend and (b) the proportions in which organic fluid and water are combined, but (c) the nature and quantity of the textile treating agents used therein as well. Notwithstanding the cited variables involved in the formation of suitable fluid emulsions of organic fluid and water with the surfactant blend of this invention, the actual preparation of such fluid emulsions is easily accomplished simply by adding the surfactant blend in small increments to organic fluid and water mixed in the desired proportions while vigorously agitating the mixture. When a fluid emulsion of the desired consistency is achieved, addition of surfactant terminated. As a practical matter, it has been found convenient to add surfactant blend to the organic fluid and water combination incrementally in amounts which increase the weight ratio of surfactant to water present in the combination by not more than about 1 part by weight of surfactant blend to each 50 parts by weight of water. Using such procedure, no instance has been found wherein a fluid emulsion of organic solvent and water suitable to the purpose of this invention as set forth herein has not been obtained. This invention, however, is by no means limited to the preparation of a fluid emulsion in the manner just described for it has been found that suitable carrier compositions may be prepared by adding the materials in any order whatever, either with or without the presence of textile treating agents. Accordingly, this invention essentially provides a carrier composition comprising a water-immiscible organic fluid, water and a surfactant blend which contains a cationic surfactant as described above and an anionic surfactant as described above in a ratio of from about 19 parts by weight to about 0.05 part by weight of said cationic surfactant to one part by weight of said anionic surfactant and preferably in a ratio of from about 3 to about 0.33, the amount of said surfactant blend present being such that said composition is a stable fluid emulsion.

In many cases, it is desirable for reasons of economy or operational efficiency to minimize the presence of one or the other of the two major fluid constituents of the carrier composition, and in most applications, as a practical matter, the carrier composition comprises organic fluid and water in a weight ratio of the former to the latter and also of the latter to the former within a range of about 500/1 to about 3/1. It has been observed that within such limited range of composition, the quantity of surfactant blend sufficient to form a fluid emulsion bears a ratio by weight to the water present within the range of about 1/100 to about 1/1.

The following are representative and preferred examples of the fluid carrier composition as provided in accordance with this invention:

EXAMPLE 13

| | Grams |
|---|---|
| 1,1,1-trichloroethane | 50 |
| Water | 50 |
| Surfactant blend of Example 2 | 0.1 |

EXAMPLE 14

| | |
|---|---|
| Trichloroethylene | 60 |
| Water | 40 |
| Surfactant blend of Example 4 | 0.1 |

EXAMPLE 15

| | |
|---|---|
| Perchloroethylene | 50 |
| Water | 50 |
| Surfactant blend of Example 5 | 10 |

EXAMPLE 16

| | |
|---|---|
| Carbon tetrachloride | 60 |
| Water | 40 |
| Surfactant blend of Example 1 | 8 |

EXAMPLE 17

| | |
|---|---|
| 1,1,1-trichloroethane | 60 |
| Water | 40 |
| Surfactant blend of Example 3 | 11 |

EXAMPLE 18

| | |
|---|---|
| 1,1,2-trichloroethane | 70 |
| Water | 30 |
| Surfactant blend of Example 6 | 6 |

EXAMPLE 19

| | |
|---|---|
| Chloroform | 70 |
| Water | 30 |
| Surfactant blend of Example 1 | 9 |

EXAMPLE 20

| | |
|---|---|
| Pentachloroethane | 70 |
| Water | 30 |
| Surfactant blend of Example 9 | 19 |

EXAMPLE 21

| | |
|---|---|
| Dichlorobenzene | 70 |
| Water | 30 |
| Surfactant blend of Example 3 | 22 |

EXAMPLE 22

| | |
|---|---|
| Dichloroethane | 80 |
| Water | 20 |
| Surfactant blend of Example 3 | 4 |

EXAMPLE 23

| | |
|---|---|
| Methylene chloride | 80 |
| Water | 20 |
| Surfactant blend of Example 8 | 7 |

EXAMPLE 24

| | |
|---|---|
| Hexachloroethane | 80 |
| Water | 20 |
| Surfactant blend of Example 2 | 9 |

EXAMPLE 25

| | |
|---|---|
| Chlorobenzene | 80 |
| Water | 20 |
| Surfactant blend of Example 5 | 12 |

EXAMPLE 26

| | |
|---|---|
| Perchloroethylene | 80 |
| Water | 20 |
| Surfactant blend of Example 7 | 14 |

EXAMPLE 27

| | |
|---|---|
| 1,1,1-trichloroethane | 80 |
| Water | 20 |
| Surfactant blend of Example 3 | 17 |

EXAMPLE 28

| | |
|---|---|
| 1,1,2-trichloroethane | 90 |
| Water | 10 |
| Surfactant blend of Example 4 | 2 |

EXAMPLE 29

| | |
|---|---|
| Perchloroethylene | 90 |
| Water | 10 |
| Surfactant blend of Example 3 | 8 |

EXAMPLE 30

| | |
|---|---|
| Perchloroethylene | 90 |
| Water | 10 |
| Surfactant blend of Example 3 | 15 |

The novel carrier composition of the present invention may be advantageously utilized for application to textile fibers and fabrics of a wide variety of chemical treating agents among which are included, for example, softening compounds, durable press compounds, antistatic compounds, scouring agents, bleaches as well as many others. For example, a textile treating composition for scouring cotton/polyester fabrics may be prepared by adding 2 parts of a mixture containnig 85 parts of 1,2-dichlorobenzene, 10 parts of a nonionic detergent, such as an alkyl phenoxy poly(ethyleneoxy)ethanol (IGEPOL), and 5 parts of the surfactant blend of Example 1 to 98 parts of water. A textile treating composition for bleaching cotton may be prepared by adding 0.8 parts of sodium hypochlorite, 4.2 parts of water, and 0.2 parts of a surfactant blend of 15% by weight of diethyl sulfate quaternary salt of polyoxyethylene(20)hydrogenated tallow amine and 85% by weight of isopropyl amine dodecyl benzene sulfonate to 995 parts of methyl chloroform.

Durable press compounds or "resins," as they are frequently termed, require the concomitant presence of catalytic materials for successful application to textile materials, and while the durable press compounds are themselves soluble in water-immiscible organic fluids, the catalysts suitable for use therewith are generally water-soluble only. In accordance with this invention both the durable press compounds soluble in organic fluid and the catalytic material soluble in water and used concomitantly therewith may be dispersed in a fluid carrier described above, that is, in a fluid emulsion of the two fluids formed and stabilized by use of the surfactant blend as hereinbefore described, to provide a textile treating bath suitable for treating textile materials to impart thereto durable press properties. Although the textile treating baths of this invention may contain amounts of water, organic solvent, and surfactant blend within the ranges earlier specified, the amounts thereof are usually selected so as to furnish a weight ratio of organic solvent to water within a range of about 500/1 to about 3/1, and preferably from about 20/1 to about 4/1, and a weight ratio of surfactant to water present within the range of about 1/100 to about 1/1, and preferably from about 1/50 to about 3/50. The amount of durable press compound present in the textile treating bath of this invention will depend mainly upon (a) the nature of the durable press compound, (b) the type of fabric to be treated therewith, and (c) the degree of durable press properties desired in the treated fabric. In general, satisfactory results have been obtained wherein the durable press compound is from about 5% to about 35% by weight, and preferably from about 8% to about 15% by weight, based on the total weight of the textile treating bath. The amount of catalyst used will depend somewhat on the nature of the durable press compound used, but, in general, the amount of catalyst used is from about 5% to about 50% by weight, and preferably from about 10% to about 35% by weight, based on the weight of durable press compound.

The textile treating baths of this invention are preferably prepared by adding an aqueous solution of the catalyst and an aqueous solution or dispersion of the durable press compound to an organic solvent solution of the surfactant blend. This invention, however, is by no means limited to the preparation of the textile treating bath in the manner just described for it has been found that suitable textile treating baths may be prepared by adding the materials in any order whatever.

Durable-press compounds or agents useful in the preparation of textile treating pad baths in accordance with the present invention include both monomer and polymers which when applied to a textile material and cured under conditions conventional in the art undergo reaction with the textile material and impart durable press and/or wrinkle resistant characteristics to the textile material.

Durable-press agents that are preferred when practicing the present invention are the aminoplast resins. These nitrogen containing resins, when applied to textile materials and heated at temperatures from 130° C. to 200° C. in the presence of a catalyst, react with the textile material and become chemically attached thereto. Exemplary of the aminoplast resins that may be employed according to the present invention are the ethylene ureas, for example, dimethylol dihydroxy ethylene urea, dimethylol ethylene urea, ethylene urea formaldehyde, and hydroxy ethylene urea formaldehyde; urea formaldehydes, for example, propylene urea formaldehyde and dimethylol urea formaldehyde; melamine formaldehyde, for example, tetramethylol melamines, and pentamethylol melamines; carbamates, for example, alkyl carbamate formaldehydes; formaldehyde-acrolein condensation products; alkylol amides, for examples, methylol formamide and methylol acetamide; acrylamides, for example, N-methylol acrylamide, N-methylol methacrylamide, and N-methylol-N-methacrylamide; haloethylene acrylamides; diureas, for example, trimethylol acetylene diurea and tetramethylol acetylene diurea, triazones, for example, dimethylol-N- ethyl triazone and halotriazones; haloacetamides; urons, for example, dimethylol uron and dihydroxy dimethylol uron. Mixtures of aminoplast resins may also be used. A preferred durable press agent is dihydroxy dimethylol ethylene urea.

Further illustrative examples of durable-press agents useful in the preparation of the textile treating compositions of this invention include aldehydes, for example, formaldehyde, glyoxyl, and α-hydroxyl adipaldehyde; epoxides, for example, ethylene glycol diglycidyl ether and vinylcyclohexene dioxide; ethyleneimine derivatives, for example, bisazeredenylcarbonyl, and tris (1-aziridinyl) phosphine oxide; chlorohydrins; sulfone derivatives, for example, divinylsulfone and dihydroxyethylsulfone—and sulfonium salts, for example, disodium tris (β-sulphatoethyl) sulfonium inner salt.

The textile resin catalyst used may be any of the acid or latent acid catalysts which are conventionally used in the art to facilitate reaction of durable press agents with textile material. By latent acid catalysts are meant substances which develop acidity during the curing step. Particularly suitable catalyst include metal salts of strong acids such as magnesium chloride, zinc chloride, magnesium sulfate, and zinc nitrate; ammonium salts such as ammonium chloride and ammonium dihydrogen phosphate; amine salts such as triethylamine hydrochloride, and triethanolamine hydrochloride.

The following are representative examples of textile treating compositions containing a durable press compound and a catalyst as provided in accordance with this invention. A preferred textile treating composition is shown in Example 31.

EXAMPLE 31

|  | Grams |
|---|---|
| 1,1,1-trichloroethane | 74.5 |
| Water | 12.75 |
| Surfactant blend of Example 1 | 0.5 |
| Dimethylol dihydroxy ethylene urea | 9 |
| Magnesium chloride | 3.25 |

EXAMPLE 32

| Trichloroethylene | 72 |
|---|---|
| Water | 8 |
| Surfactant blend of Example 2 | 5 |
| Dimethylol-5-hydroxy propylene urea | 7 |
| Zinc chloride | 0.4 |

EXAMPLE 33

| Perchloroethylene | 40 |
|---|---|
| Water | 10 |
| Surfactant blend of Example 3 | 0.2 |
| Dimethylol methoxy ethyl carbamate | 12 |
| Magnesium chloride | 2 |

EXAMPLE 34

| Carbon tetrachloride | 200 |
|---|---|
| Water | 10 |
| Surfactant blend of Example 9 | .6 |
| 1,3-dimethylol hexahydro-pyrimidinone-2 | 25 |
| Zinc nitrate | 2.5 |

EXAMPLE 35

| Chloroform | 80 |
|---|---|
| Water | 20 |
| Surfactant blend of Example 5 | 6 |
| Dimethylol dihydroxy ethylene urea | 20 |
| Ammonium chloride | 6 |

EXAMPLE 36

| Dichlorobenzene | 70 |
|---|---|
| Water | 10 |
| Surfactant blend of Example 6 | 0.4 |
| Dimethylol-5,5-dimethyl propylene urea | 15 |
| Triethanolamine hydrochloride | 4.5 |

EXAMPLE 37

| Methylene chloride | 80 |
|---|---|
| Water | 20 |
| Surfactant blend of Example 4 | 0.4 |
| Disodium tris(β - sulphatoethyl)sulfonium inner salt | 1.6 |
| Magnesium chloride | 1.6 |

EXAMPLE 38

| Hexachloroethane | 80 |
|---|---|
| Water | 4 |
| Surfactant blend of Example 8 | 1 |
| Dimethylol dihydroxy ethylene urea | 10 |
| Zinc chloride | 0.6 |

EXAMPLE 39

| Naptha | 60 |
|---|---|
| Water | 10 |
| Surfactant blend of Example 7 | 0.4 |
| Dimethylol uron | 25 |
| Magnesium chloride | 7.5 |

The textile treating baths containing an organic solvent, water, surfactant, durable press compound, and catalyst as hereinbefore described may also contain a textile softening compound to impart improved abrasion resistance, hand, and tear strength to textile materials treated therewith. Accordingly, this invention provides textile treating baths containing organic solvent, water, surfactant blend, durable press compound, textile resin catalyst for the durable press compound, and textile softening compound.

Textile softening compounds used in the textile treating baths of this invention include any compound which when applied to textile materials impart thereto abrasion resistance, hand, and/or tear strength properties. Textile softening compounds are well known in the art and are generally fatty acid derivatives, such as fatty acid esters, amides, and fatty amines and their quaternary ammonium derivatives, or polymers, such as emulsified polyethylene, acrylic polymers and silicone polymers. A particularly preferred class of textile softening compounds which may be used in the textile treating baths of this invention comprise a class of carbamic esters containing a thermally stable carbamic ester group derived from a long chain fatty alcohol, an oxyethylated long chain fatty alcohol, or an oxyethylated long chain fatty acid, and at least one thermally labile carbamic ester group derived from a phenol or caprolactam. These carbamic esters comprise a class of compounds which may be characterized by a formula selected from the group consisting of the following generalized formulae wherein identical symbols have identical signification:

(1)

and (2)
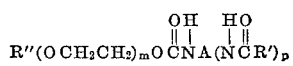

wherein R is an alkyl or an alkenyl group containing from 10 to 22 carbon atoms, wherein $n$ is a number from 0 to 40, wherein A is the group remaining after removing all the isocyanate groups from an aromatic polyisocyanate, wherein R' is selected from the group consisting of phenoxy, methyl phenoxy, ethyl phenoxy, and 2-oxo-hexahydroazepin-1-yl, wherein $p$ is an integer having a value of at least 1, wherein R'' is an acyl group containing from 10 to 22 carbon atoms, and wherein $m$ is a number having a value from 2 to 40.

The above defined carbamates may be prepared by reacting, simultaneously or consecutively in any order, aromatic polyisocyanate, a fatty compound selected from the group consisting of fatty alcohols, oxyethylated fatty alcohols, and oxyethylated fatty acids, and a thermally reversible blocking agent such as phenol, methyl phenol, dimethyl phenol, trimethyl phenol, ethyl phenol, caprolactam, and mixtures thereof. Thus, the polyisocyanate may be reacted with the blocking agent in such proportions that one —NCO group remains and may subsequently be reacted with the fatty compound. Alternatively, it is possible to conduct the reaction in the reverse order so that the polyisocyanate is reacted first with the fatty compound and afterwards with the blocking agent. It is also possible to perform the reaction by admixing all the reactants in suitable proportions so that the reactions proceed simultaneously.

The amounts of fatty compound, polyisocyanate, and blocking agent used are selected to ensure that the resulting carbamate contains one thermally stable carbamate group derived from the fatty compound, at least one thermally labile carbamate group derived from the blocking agent, and no free isocyanate groups. This may be accomplished by reacting one mol of the fatty compound and $n$ minus one mols of blocking agent with each mol of aromatic polyisocyanate containing $n$ isocyanate groups per molecule. Thus, one mol of the fatty compound and one mol of blocking agent are reacted with each mol of a diisocyanate whereas one mol of the fatty compound and two mols of blocking agent are reacted with each mol of a triisocyanate. The reaction is carried out under conditions which exclude moisture and preferably in the substantial absence of oxygen to minimize discoloration of the resulting carbamate. Temperatures up to 180° C. may be used. Preferably, the reaction is carired out at 35° C. to 50° C. when caprolactam is used as the blocking agent and at 120° C. to 160° C. when a phenol is used as the blocking agent. The reaction may be conducted in the absence of a solvent or in the presence of a solvent which is inert to isocyanate groups. Illustrative examples of such solvents include Cellosolve acetate, acetone, methyl ethyl ketone, cyclohexanone, chloroform, benzene, perchloroethylene, chlorobenzene, and trichloroethane. If desired, catalyst such as aliphatic tertiary amines, alkali or alkaline earth metal oxides, carbonates, alcoholates, and phenates, and metal salts of carboxylic acids may be used to facilitate the reaction. If catalyst is used, it should be neutralized after completion of the reaction.

The fatty compounds which may be used to prepare the carbamates are selected from the group consisting of fatty alcohols characterized by the generalized formula ROH wherein R is an alkyl group containing from 10 to 22 carbon atoms or an alkenyl group containing from 10 to 22 carbon atoms, oxyethylated fatty alcohols characterized by the generalized formula $R(OCH_2CH_2)_nOH$ wherein R is an alkyl group containing from 10 to 22 carbon atoms or an alkenyl group containing from 10 to 22 carbon atoms and wherein $n$ is a number having a value of not more than 40 and preferably from 2 to 40, and oxyethylated fatty acids characterized by the generalized formula $R''(OCH_2CH_2)_mOH$ wherein R'' is an acyl group containing from 10 to 22 carbon atoms and wherein $m$ is a number having a value from 2 to 40. The oxyethylated fatty alcohols and oxyethylated fatty acids may be prepared by reacting ethylene oxide with the appropriate fatty alcohol or fatty acid under reaction conditions conventional in the art. Illustrative examples of higher fatty alcohols which may be used include decyl alcohol, decenyl alcohol, dodecyl alcohol, dodecenyl alcohol, tetradecyl alcohol, tetradecenyl alcohol, hexadecyl alcohol, hexadecenyl alcohol, octadecyl alcohol, octadecenyl alcohol, eicosyl alcohol eicosenyl alcohol, docosyl alcohol, docosenyl alcohol, and nonadecenyl alcohol. Illustrative examples of long-chain fatty acids which may be reacted with ethylene oxide include capric acid, lauric acid, lauroleic acid, myristic acid, myristoleic acid, pentadecanoic acid, palmitic acid, palmitoleic acid, margaric acid, stearic acid, oleic acid, ricinoleic acid, arachidic acid, eicosenoic acid, behenic acid, and docosenoic acid.

The polyisocyanates which may be used to prepare the carbamates of this invention are aromatic polyisocyanates, that is isocyanates containing at least two NCO groups directly attached to carbon atoms of an aromatic ring. Illustrative examples of aromatic polyisocyanates which may be used to prepare the carbamates include 2,4-tolylene diisocyanate; 2,6-tolylene diisocyanate; phenylene diisocyanate; methoxy phenylene 2,4-diisocyanate; diphenylmethane 4,4'-diisocyanate; 3-methyl-diphenylmethane 4,4'-diisocyanate; diphenylether 2,4,4'-triisocyanate; and mixtures thereof. The preferred aromatic polyisocyanate is 2,4-tolylene diisocyanate.

The following illustrative examples are given in order that those skilled in the art may better understand the nature and preparation of the carbamates which are used in the textile treating compositions of this invention. These examples are set forth solely for the purpose of illustration and any specific enumeration of details contained therein should not be interpreted as expressing limitations of this invention. All parts and percentages are by weight, unless otherwise stated.

EXAMPLE A 486.6 grams of polyoxyethylene(20)oleyl alcohol which has been vacuum stripped of water to 150° C. and 1 mm. pressure are charged to a 3-necked flask fitted with stirrer, thermometer and nitrogen inlet. 59.2 grams of caprolactam and 71 grams of 1,1,1-trichloroethane are added to the flask and the contents of the flask heated to 60° C. with stirring to achieve complete solution. The solution is then cooled to 40° C. with an ice bath and a flow of nitrogen introduced into the flask. 91.2 grams of toluene diisocyanate are slowly added while maintaining the temperature at 35–50° C. The temperature is maintained at 50° C. for 90 minutes. The rection product is a 92% solution of a carbamate characterized by the formula $C_{18}H_{35}O(C_2H_4O)_{20}CONHC_6H_3(CH_3)NHCONC_6H_{11}O$ in trichloroethane.

EXAMPLE B 405 grams of melted phenol are charged to a 3-liter, 3-necked flask fitted with a stirrer, heating mantle, and thermometer. 750 grams of tolylene diisocyanate are added slowly and with stirring over a five minute period. The contents of the flask are heated at 150° C. for two hours. The resulting reaction product contained 30.5% total NCO groups. 128.9 grams of this reaction product and 459.3 grams of polyoxyethylen(20) oleyl alcohol are charged to a 1-liter, 3-necked flask fitted with heating mantle, stirrer, and thermometer. The stirrer is started, nitrogen is introduced into the flask, and the temperature is raised to 150° C. over a 25 minute period. The temperature is maintained at 150° C. for 2 hours. The reaction product is an amber liquid having the formula $C_{18}H_{35}O(C_2H_4O)_{20}CONHC_6H_3(CH_3)NHCOOC_6H_5$

EXAMPLE C

Equal molar amounts of phenol, toluene diisocyanate, and polyoxyethylene(10)stearyl alcohol are reacted in accordance with the method of Example B. The resulting carbamate is a hazy, yellow liquid which solidifies to a soft wax on cooling to room temperature. The carbamate contains no free NCO group.

EXAMPLE D

Equal molar amounts of toluene diisocyanate, phenol, and polyoxyethylene (10) oleyl alcohol are reacted in accordance with the method of Example B. The resulting carbamate has no free NCO groups and contains one thermally labile carbamic acid ester group derived from the phenol and one thermally stable carbamic acid ester group derived from the polyoxyethylene (10) oleyl alcohol.

EXAMPLE E

Polyoxyethylene(20)stearyl alcohol, phenol, and toluene diisocyanate are reacted in accordance with the procedure of Example B. The resulting carbamate contains no free NCO groups.

EXAMPLE F

Equal molar amounts of polyoxyethylene(2)oleyl alcohol caprolactam, and toluene diisocyanate are reacted according to the following procedure. 0.5 mol of polyoxyethylene(2)oleyl alcohol which has been vacuum stripped of water at 150° C. and 1 mm. of pressure is charged to a three-necked flask fitted with stirrer, thermometer and nitrogen inlet. 0.5 mol of caprolactam and 71 grams of 1,1,1-trichloroethane are added to the flask and the contents of the flask heated to 60° C. with stirring to achieve complete solution. The solution is then cooled to 40° C. with an ice bath and a flow of nitrogen introduced into the flask. 0.5 mol of toluene diisocyanate are slowly added while maintaining the temperature at 35–50° C. The temperature is maintained at 50° C. for 90 minutes. The reaction carbamate is characterized by the formula

EXAMPLE G

Equal molar amounts of polyoxyethylene(20)dodecyl alcohol, caprolactam, and toluene diisocyanate are reacted according to the procedure of Example F. The resulting carbamate is found to contain 0.3% free NCO groups.

EXAMPLE H

Example F is repeated except that polyoxyethylene(17) cetyl alcohol is substituted for the polyoxyethylene(2) oleyl alcohol. The resulting product is a 92% solution of the carbamate in 1,1,1-trichloroethane. The carbamate is found to contain only 0.2% free NCO groups.

EXAMPLE J 312 grams of decenyl alcohol and 188 grams of phenol are added with stirring to 480 ml. of 2-ethoxy ethyl acetate. 352 grams of tolylene diisocyanate and then added, and the resulting mixture heated to 150° C. for 2 hours. The resulting carbamate is characterized by the formula

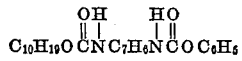

EXAMPLE K 362. 8 grams of polyoxyethylene(40)stearic acid and 26.2 grams of caprolactam are added to 48 grams of 1,1,1-trichloroethane. 40.4 grams of toluene diisocyanate are slowly added over a 30 minute period. The reaction mixture is then heated at 70° C. for 2 hours. The resulting product is a carbamate containing one thermally labile carbamic acid ester group derived from the caprolactam and one thermally stable carbamic acid ester group derived from the polyoxyethylene(40)stearic acid.

EXAMPLE L 62.2 grams of caprolactam and 95.7 grams of toluene diisocyanate are added to 158 grams of 1,1,1-trichloroethane. The mixture is then heated at 70° C. for 3 hours. The reaction product is then cooled to 37° C., and 380 grams of polyoxyethylene (8) oleic acid are added over a 58 minute period while maintaining the temperature at 42–48° C. The reaction mixture is then heated at 50–55° C. for one hour. The resulting product is a carbamate containing one thermally labile carbamic acid ester group derived from the caprolactam and one thermally stable carbamic acid ester group derived from the polyoxyethylene (8) oleic acid.

The amount of textile softening compound used in the textile treating compositions of this invention is not critical and will depend mainly upon (a) the nature of the textile softening compound used, (b) the nature and quantity of the durable press agent, (c) the nature of the textile material treated therewith, (d) the degree of softness desired in the treated fabric, and (e) the amount of textile treating composition applied to the textile material. In general, the amount of textile softening compound used is from about 1% to about 5%, and preferably from about 1.5% to about 2.5%, based on the total weight of textile treating composition. It is understood, of course, that amounts up to 10% or even higher may be used, if desired.

The textile softening compound may be added to the textile treating bath in any suitable manner or at any time during the preparation of the bath for it has been found that suitable textile treating baths may be prepared by adding the materials in any order whatever. A particularly preferred method of incorporating the textile softening compound into the textile treating bath is to add the textile softening compound to the surfactant blend and then add the resulting mixture to the organic solvent. Accordingly, this invention provides a textile treating composition comprising a mixture or blend of a textile softening compound and a surfactant. The amounts of textile softening compound and surfactant blend present in the mixture will depend somewhat on the nature of the softener and surfactants used. Satisfactory results may be obtained by using from about 10% to about 40%, preferably from about 15% to about 30%, by weight of the surfactant blend and from about 90% to about 60%, preferably from about 85% to about 70%, by weight of the textile softenining compound, based on the total weight of softener and surfactant blend.

The following are illustrative examples of textile treating compositions comprising textile softening compound and surfactant. A preferred textile treating composition is shown in Example 40.

EXAMPLE 40

| | Grams |
|---|---|
| Surfactant blend of Example 1 | 30 |
| Textile softening composition of Example F | 70 |

EXAMPLE 41

| | |
|---|---|
| Surfactant blend of Example 2 | 10 |
| Textile softening composition of Example L | 90 |

EXAMPLE 42

| | |
|---|---|
| Surfactant blend of Example 4 | 15 |
| Textile softening composition of Example A | 85 |

EXAMPLE 43

| | |
|---|---|
| Surfactant blend of Example 3 | 40 |
| Textile softening composition of Example K | 60 |

EXAMPLE 44

| | |
|---|---|
| Surfactant blend of Example 8 | 30 |
| Textile softening composiiton of Example B | 70 |

EXAMPLE 45

| | |
|---|---|
| Surfactant blend of Example 5 | 20 |
| Textile softening composition of Example J | 80 |

EXAMPLE 46

| | |
|---|---|
| Surfactant blend of Example 7 | 25 |
| Textile softening composition of Example C | 75 |

EXAMPLE 47

| | |
|---|---|
| Surfactant blend of Example 6 | 21 |
| Textile softening composition of Example H | 79 |

EXAMPLE 48

| | |
|---|---|
| Surfactant blend of Example 9 | 29.4 |
| Textile softening composition of Example D | 70.6 |

EXAMPLE 49

| | |
|---|---|
| Surfactant blend of Example 10 | 18 |
| Textile softening composition of Example G | 82 |

EXAMPLE 50

| | |
|---|---|
| Surfactant blend of Example 1 | 27 |
| Textile softening composition of Example E | 73 |

The following are illustrative examples of textile treating baths of this invention which contain a durable press compound, textile resin catalyst for the durable press compound, textile textile softening compound and fluid carrier system. A preferred pad is shown in Example 51.

EXAMPLE 51

| | Grams |
|---|---|
| 1,1,1-trichloroethane | 74.5 |
| Water | 12.75 |
| Surfactant blend of Example 1 | 0.5 |
| Dimethylol dihydroxy ethylene urea | 9.0 |
| Magnesium chloride | 3.25 |
| Carbamate of Example F | 1.9 |

EXAMPLE 52

| | |
|---|---|
| Naphtha | 60 |
| Water | 10 |
| Surfactant of Example 7 | 0.4 |
| Dimethylol-5-hydroxy propylene urea | 25 |
| Zinc chloride | 7.5 |
| Carbamate of Example A | 2 |

EXAMPLE 53

| | |
|---|---|
| Trichloroethylene | 40 |
| Water | 10 |
| Surfactant blend of Example 2 | 0.2 |
| Dimethylol uron | 12 |
| Magnesium chloride | 2 |
| Carbamate of Example C | 1.6 |

EXAMPLE 54

| | |
|---|---|
| Perchloroethylene | 80 |
| Water | 4 |
| Surfactant blend of Example 3 | 1 |
| Dimethylol methoxy ethyl carbamate | 10 |
| Zinc nitrate | 5 |
| Carbamate of Example D | 4 |

EXAMPLE 55

| | |
|---|---|
| Hexachloroethane | 200 |
| Water | 10 |
| Surfactant blend of Example 8 | 0.6 |
| Dimethylol dihydroxy ethylene urea | 25 |
| Triethanolamine hydrochloride | 5 |
| Carbamate of Example E | 1.8 |

EXAMPLE 56

| | |
|---|---|
| Carbon tetrachloride | 80 |
| Water | 20 |
| Surfactant blend of Example 1 | 0.4 |
| 1,3-dimethylol hexahydro-pyrimidinone-2 | 16 |
| Magnesium chloride | 1.6 |
| Carbamate of Example J | 2 |

EXAMPLE 57

| | |
|---|---|
| Methylene chloride | 80 |
| Water | 20 |
| Surfactant blend of Example 4 | 6 |
| Dimethylol-5,5-dimethyl propylene urea | 20 |
| Ammonium chloride | 6 |
| Carbamate of Example L | 1.6 |

EXAMPLE 58

| | |
|---|---|
| Dichlorobenzene | 72 |
| Water | 8 |
| Surfactant blend of Example 6 | 5 |
| Disodium tris($\beta$-sulphatoethyl)sulfonium inner salt | 7 |
| Zinc nitrate | 3 |
| MYKON SF (aqueous emulsion of polyoxyethylene) | 5 |

EXAMPLE 59

| | |
|---|---|
| 1,1,1-trichloroethane | 70 |
| Water | 10 |
| Surfactant blend of Example 5 | 0.4 |
| Dimethylol dihydroxy ethylene urea | 15 |
| Magnesium chloride | 4.5 |
| Carbamate of Example K | 1.1 |

EXAMPLE 60

| | |
|---|---|
| Chloroform | 79.5 |
| Water | 9.5 |
| Surfactant blend of Example 1 | 0.5 |
| Dimethylol dihydroxy ethylene urea | 6.75 |
| Magnesium chloride | 1.95 |
| Carbamate of Example G | 1.80 |

In accordance with the present invention, the above described textile treating compositions containing a durable press agent or a mixture of a durable press agent and a textile softening compound may be used to treat textile materials to impart thereto improved physical characteristics such as durable press, wrinkle resistance, tear strength, hand, and abrasion resistance. It has been found that if the textile treating compositions of this invention are applied to textile material along with a textile resin catalyst for the durable press agent and the treated textile material heated to an elevated temperature, the durable press agent, and the carbamate if present, will be attached to the textile material so that the improved properties imparted to the textile material will not be removed by subsequent washing or drycleaning. Although this invention is not limited by theoretical considerations, it is believed that the thermally labile carbamate group of the carbamate decomposes at elevated temperatures to form an aromatic NCO group and free phenol or free caprolactam and that the aromatic NCO group then reacts with active hydrogen present in the textile material or in the durable press agent to form a thermally stable group. The durable press agent also reacts with active hydrogen present in the textile material and becomes attached thereto so that the durable-press properties imparted to the textile material will not be removed by subsequent washing.

Textile materials may be treated with the textile treating compositions of this invention by any suitable means, such as by immersion therein or by spraying. In the immersion method of application, the textile material may either be run through a padding machine wherein the textile material is first dipped into the bath and then squeezed, or the textile materials may be dipped into the bath and the excess liquid extracted by centrifugation. In the spraying method of application, the textile materials are simply sprayed with the bath and then dried by any suitable means.

It is necessary to subject the textile material having a textile treating composition of this invention thereon to an elevated temperature in order to initiate a curing reaction between the said composition and the textile material. The particular temperature used and the duration of the heating step depends on the nature of the textile material used and on the particular textile softening compound and durable press resin used. In each situation, however, the temperature and heating time is that necessary to sufficiently cause reaction of the textile softening compound and durable press resin with the textile material. Generally, the heat cure may be effective at temperatures from about 100° F. to about 350° F. and in periods of time ranging from about 40 to 60 minutes at the lower temperature to about 2 to 3 minutes at the higher temperature. The preferred temperature is from about 300° F. to 350° F. The heat cure of textile materials treated in accordance with this invention may be facilitated and any tendency of the treated fabrics to yellow during the curing step eliminated by adding a nonionic surfactant, for example, polyoxyethylene ethers of castor oil or hydrogenated castor oil, to the textile treating bath. A preferred nonionic surfactant is polyoxyethylene(25)hydrogenated castor oil. The nonionic surfactant may be added to the mixture of textile softening compound, anionic surfactant and cationic surfactant prior to addition thereof to the organic fluid.

Textile materials which may be treated with the textile compositions of this invention include any textile material contaning active hydrogen atoms; for example, textile material comprising cellulose or modified cellulose such as cotton, rayon, linen, and mixtures thereof; textile material containing noncellulosics such as nylon, polyhexamethylene adipamide, polycaproamide, polyethylene terephthalate, acrylics, and mixtures thereof; and textile materials comprising a blend of cellulosic materials and noncellulosic materials. The textile materials may be in the form of filaments, fibers, threads and yarns or in the form of woven, nonwoven, knit, or otherwise formed fabrics, sheets, and cloths. The preferred textile material is woven cotton fabric.

The following examples are illustrative of the application of textile treating compositions of this invention to textile material. These examples are set forth solely for the purpose of illustration and any specific enumeration of details contained therein should not be interpreted as expressing limitations of this invention. All parts and percentages are by weight, unless otherwise stated.

EXAMPLE 61

A textile treating pad bath is prepared by adding 5 parts of an emulsifier comprising 37% of isopropyl amine dodecyl benzene sulfonate and 63% of diethyl sulfate quaternized polyoxyethylene(20)tallow amine to 72 parts of 1,1,1-trichloroethane, adding 5 parts of magnesium chloride hexahydrate, and then adding 15 parts of a 45% aqueous solution of dihydroxydimethylolethyleneurea and 3 parts of a mixture comprising 3% isopropyl amine dodecyl benzene sulfonate, 7.8% 1,1,1-trichloroethane, and 89.2% of the carbamate of Example A. The textile treating bath is applied to cotton poplin fabrics at 70% wet pickup. The treated fabrics are dyed for 3 minutes at 225° F., cured at 300° F. for 10 minutes, and conditioned for 24 hours at 70° F. and 65% R.H. One half of the fabrics are washed ten times in 0.2% detergent solution at 60° C. The treated fabrics have a crease angle recovery in the warp plus fill directions of 294 degrees prior to washing and 281 degrees after ten washings, an abrasion resistance in the warp plus fill directions of above 3500 cycles prior to washing and 3616 cycles after ten washings, and a tear strength in the warp direction of 2.40 pounds prior to washing and 2.86 pounds after ten washings.

EXAMPLE 62

Cotton poplin fabrics are padded at 70% wet pickup of the Butterworth Pad with a bath containing 15% of a 45% aqueous solution of dihydroxydimethylolethyleneurea, 3% of a 65% aqueous solution of magnesium chloride hexahydrate, 0.18% isopropylamine dodecylbenzenesulfonate, 0.32% diethyl sulfate quaternized polyoxyethylene(20)tallow-amine, 1.8% of the carbamate, of Example F and 79.7% 1,1,1-trichloroethane. The padded fabrics are dried for 3 minutes at 225° F., cured for ten minutes at 325° F., and conditioned for 48 hours at 65% R.H. and 75° F. The treated fabrics have a crease angle recovery in the warp plus fill directions of 270 degrees prior to washing and 274 degrees after five washings, an abrasion resistance in the warp plus fill directions of 3439 cycles prior to washing and 2535 cycles after five washings, and a tear strength in the warp direction of 2.04 pounds prior to washing and 2.29 pounds after five washings.

EXAMPLE 63

A textile treating bath is prepared by adding 17 parts of a mixture of 2 parts of the carbamate prepared in Example K, and 15 parts of a 50% aqueous solution of dimethylol urea-formaldehyde, 3 parts of zinc nitrate, 1.8 parts of isopropyl amine dodecyl amine sulfate, and 3.2 parts of diethyl sulfate quaternary of polyoxyethylene-(20)hydrogenated tallow amine to 75 parts of 1,1,1-trichloroethane. A 65/35 cotton/Dacron polyester fabric is treated with the bath at 70% wet pickup. The fabric is heated at 225° F. for 3 minutes and at 300° F. for 10 minutes. The cured fabric has excellent crease angle recovery and has appreciably higher tear strength, softness, abrasion resistance, and soil release that a fabric treated with the durable-press resin and catalyst, but not carbamate.

EXAMPLE 64

A textile pad bath is prepared by adding 0.5 part of a surfactant blend containing 37% of isopropyl amine dodecyl benzene sulfonate and 63% of diethyl sulfate quaternized polyoxyethylene(20)tallow amine to 74.5 parts of 1,1,1-trichloroethane with stirring. To the solvent/surfactant blend are added 5 parts of a 65% aqueous solution of magnesium chloride, 20 parts of a 45% aqueous solution of dihydroxydimethylolethyleneurea, and 1.5 parts of a mixture of 80% of the polyoxyethylene(2)oleyl ether-toluene diisocyanate-caprolactam product of Example F and 20% of a polyoxyethylene(20)hydrogenated castor oil. The resulting bath is applied to cotton fabric at 70% wet pick up. The treated fabric is dried for 3 minutes at 225° F., cured at 340° F. for five minutes, and conditioned overnight at 70° F. and 65% R.H. After five washing cycles in hot detergent solution, the treated fabric has a crease angle recovery in the warp plus fill directions of 255 degrees, a Stoll Flex Abrasion resistance in the warp plus fill directions of 1016 cycles, and an Elmendorf Tear Strength in the warp direction of 1.49 pounds.

EXAMPLE 65

A textile treating pad bath is prepared by adding 5 parts of a surfactant blend containing 37% of isopropyl amine dodecyl benzene sulfonate and 63% of diethyl sulfate quaternized polyoxyethylene(20)tallow amine to 745 parts of 1,1,1-trichloroethane with stirring. 50 parts of a 65% aqueous solution of magnesium chloride are added to the solvent/surfactant solution with stirring. 200 parts of a 45% aqueous solution of dihydroxydimethylolethyleneura are added last with stirring to complete preparation of the pad bath. The bath is then applied to cotton poplin fabrics at 70% wet pick up. The treated fabric is dried for 3 minutes at 225° F. and then cured for five minutes at 340° F. The cured fabrics are conditioned overnight at 70° F. and 65% R.H. prior to physical testing. After 5 washing cycles in hot detergent solution, the fabrics have a crease angle recovery in the warp plus fill directions of 266 degrees.

It will be understood that the compositions of the present invention as described herein include those compositions containing the named ingredients and any other ingredients which do not destroy the effectiveness of the compositions for the purposes stated in the specification and, although this invention has been described with reference to specific materials, including specific anionic, cationic and nonionic surfactants, durable press compounds, catalysts, textile softening compounds, and organic solvents, it will be apparent that still other different and equivalent materials may be substituted for those specifically described. Moreover, application processes and procedures may be modified, reversed, or even in some cases eliminated, all within the spirit and scope of this invention.

Having described the invention, what is desired to be secured by Letters Patent is:

1. A surfactant composition consisting essentially of a mixture of from 5% to about 95% by weight of a cationic surfactant characterized by the following generalized formula:

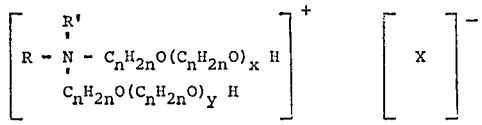

wherein $n$ represents an integer from 2 to 4, $x$ represents a number from 0 to 100, $y$ represents a number from 0 to 100, R represents a radical selected from the group consisting of alkyl and alkenyl radicals containing from 6 to 22 carbon atoms, R' represents a radical selected from the group consisting of alkyl and hydroxyalkyl radicals containing from 1 to 5 carbon atoms, and X represents an anion, and from 95% to 5% by weight of an anionic surfactant characterized by a generalized formula selected from the group consisting of the following generalized formulae wherein identical symbols have an identical signification:

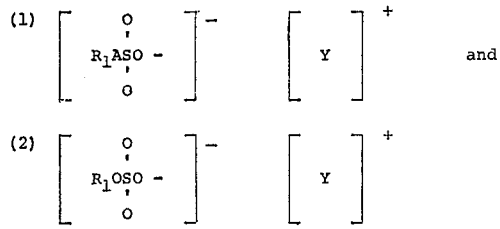

wherein $R_1$ represents a radical selected from the group consisting of alkyl and alkenyl radicals containing from 6 to 22 carbon atoms, A represents an arylene radical, and Y represents a cation selected from the group consisting of alkali metals and alkyl substituted ammonium ions.

2. A surfactant composition of claim 1 wherein the cationic surfactant is from about 50% to about 65% by weight and the anionic surfactant is from about 50% to about 35% by weight, based on the total weight of cationic surfactant and anionic surfactant.

3. A surfactant composition of claim 1 wherein the cationic surfactant is from about 25% to about 75% by weight and the anionic surfactant is from about 75% to about 25% by weight based on the total weight of cationic surfactant and anionic surfactant.

4. A surfactant composition of claim 3 wherein the cationic surfactant is diethyl sulfate quaternary salt of polyoxyethylene(20) hydrogenated tallow amine.

5. A surface composition of claim 3 wherein the anionic surfactant is isopropylamine salt of dodecyl benzene sulfonate.

6. A surfactant composition of claim 3 wherein the cationic surfactant is diethyl sulfate quaternary salt of polyoxyethylene(2) hydrogenated tallow amine and wherein the anionic surfactant is isopropylamine salt of dodecyl benzene sulfonate.

7. A surfactant composition of claim 6 containing about 63% by weight of cationic surfactant and about 37% by weight of anionic surfactant.

References Cited
UNITED STATES PATENTS

| | | | |
|---|---|---|---|
| 2,731,338 | 1/1956 | Fike et al. | 252—355 X |
| 3,018,251 | 1/1962 | Mayhew et al. | 252—355 X |
| 3,088,796 | 5/1963 | Kahler et al. | 252—357 X |
| 3,256,202 | 6/1966 | Weiss et al. | 252—353 X |
| 3,325,414 | 6/1967 | Inamorato | 252—152 X |
| 3,424,689 | 1/1969 | Kakegawa et al. | 252—152 X |
| 3,503,890 | 3/1970 | Davisson et al. | 252—152 |
| 3,519,562 | 7/1970 | Lanner | 252—8.8 |

HERBERT B. GUYNN, Primary Examiner

H. A. PITLICK, Assistant Examiner

U.S. Cl. X.R.

8—115.6, 116.2, 116.3, 116.4, 120; 38—114; 252—8.75, 171, 308, 312, 547, 550, 559; 260—29.4

UNITED STATES PATENT OFFICE
CERTIFICATE OF CORRECTION

Patent No. 3,658,717  Dated April 25, 1972

Inventor(s) Kenneth W. Graff

It is certified that error appears in the above-identified patent and that said Letters Patent are hereby corrected as shown below:

Column 5, line 54, "32/1000" should read -- 32/100 --.

Column 9, line 14, "dihydroxyethylsulfone--" should read -- dihydroxyethylsulfone; --.

Column 11, line 30, "carired" should read -- carried --.

Column 12, Example A, line 35, "rection" should read -- reaction --.

Column 15, Example 50, line 13, after the word "textile" and before the word "softening", delete the word "textile."

Column 15, Example 50, line 14, after the word "pad" and before the word "is", insert the word -- bath --.

Column 17, Example 62, line 63, the first word of that line, "of" should read -- on --.

Column 18, Example 65, line 54, "ethyleneura" should read -- ethyleneurea --.

Signed and sealed this 15th day of May 1973.

(SEAL)
Attest:

EDWARD M. FLETCHER, JR.
Attesting Officer

ROBERT GOTTSCHALK
Commissioner of Patents